UNITED STATES PATENT OFFICE.

HENRY PREUSS, OF NEW YORK, N. Y.

IMPROVED COMPOSITION FOR LINING BARRELS, &c., FOR CONTAINING PETROLEUM.

Specification forming part of Letters Patent No. 45,857, dated January 10, 1865.

*To all whom it may concern:*

Be it known that I, HENRY PREUSS, of No. 61 Cedar street, in the city, county, and State of New York, have invented a new and improved composition for lining and coating articles of wood, stone, &c.; and I do hereby declare that the following is a full, clear, and exact description thereof, which will enable others skilled in the art to fully understand and make use of the same.

This invention relates to a composition the principal object of which is to render petroleum barrels or packages perfectly tight and prevent loss by leakage, but which can also be used for lining or coating other vessels or articles, which I prefer to use, and which I shall proceed to describe as an illustration of my invention.

The composition consists of a mixture of glue, alum, litharge, and a small quantity of chloride of lime, which is added to neutralize the original bad smell of the composition.

The ingredients which constitute my composition are mixed together in about the following proportion: glue, sixty pounds; alum, fifteen to twenty pounds; litharge, eight to ten pounds; chloride of lime, one-fourth pound. I first dissolve the glue in a quantity of cold water sufficient to cover the glue, and as soon as the same has dissolved I heat the same to near the boiling-point and then add the alum, which must be previously reduced to small pieces, and stir well until it is intimately mixed with the solution of glue. I then dissolve the litharge in water and add it to the mixture, while continually stirring to prevent the litharge sinking down to the bottom.

By the litharge the compound is rendered hard and durable, and, when applied to a barrel or other articles, it penetrates the pores, and all the crevices thereof and effectually prevents leakage.

Chloride of lime may be added to neutralize the bad smell of the composition which it has when not mixed with some such neutralizing agent.

This composition is perfectly impervious to water and oils of any kind, and it is therefore invaluable to produce hermetic barrels or packages for oil, &c.; but it also can be used for coating articles of wood, stone, or other materials to protect them against the influence of rain or moisture of any kind.

It is quite common to use for lining petroleum-barrels glue, with some material—such as tannin, alum, sulphate of iron, &c—capable of rendering the glue insoluble in water. A lining of this kind is impracticable, because it is liable to crack or scale off, particularly when the hoops are driven, and if a crack occurs in one place the benefit of the lining is destroyed. For this reason it is necessary to mix the glue and alum or other astringent matter with some material capable of rendering the mixture tough and firm and remove its quality to crack. Some inventors use sirup, (Hook and Darlington,) others soap, (Schumann and Frash,) and I use litharge. By the use of litharge, in combination with glue and alum or other astringent matter, an entirely different combination is obtained than by the use of glue, sulphate of iron, and soap, or by the use of glue, tannin, and sirup. Litharge in itself has the property to render wood and other articles to a certain extent impervious to liquids, and it is used to protect iron against rust or the influence of moisture.

I claim as new and desire to secure by Letters Patent—

A composition produced by combining litharge with glue or its equivalent with or without other materials, for lining barrels or other packages for oil.

HENRY PREUSS.

Witnesses:
JAMES P. HALL,
J. C. HENRY BACHMANN.